Figure 1:
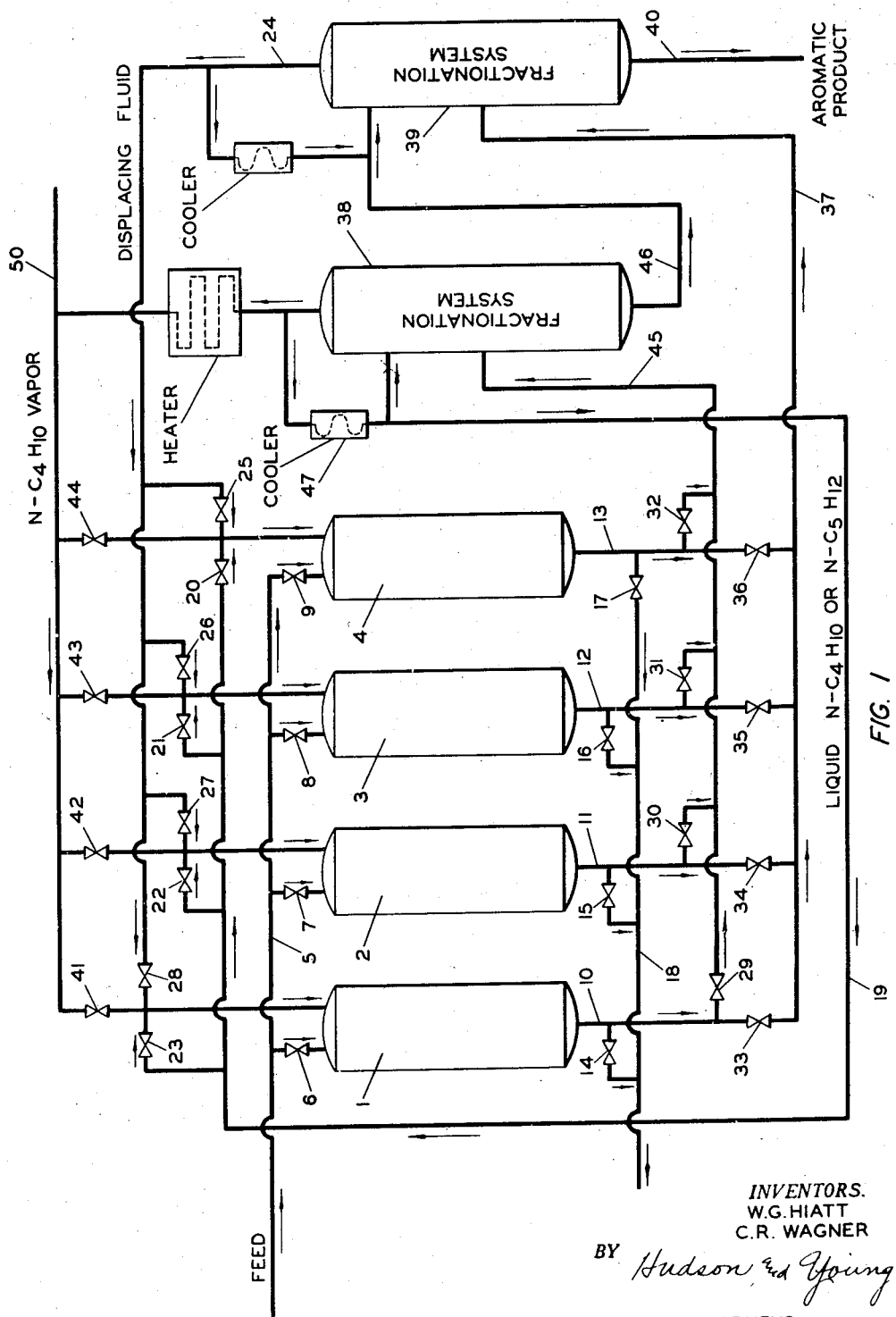

Patented Mar. 15, 1949

2,464,311

UNITED STATES PATENT OFFICE 2,464,311

RECOVERY OF AROMATIC HYDROCARBONS

William G. Hiatt, Bartlesville, Okla., and Cary R. Wagner, Utica, Ohio, assignors to Phillips Petroleum Company, a corporation of Delaware Application November 13, 1945, Serial No. 628,311

4 Claims. (Cl. 260—674)

This invention relates to improvements in methods for the recovery of aromatic hydrocarbons from admixture with other hydrocarbons. In one particular aspect it relates to improvements in methods for the recovery of aromatic hydrocarbons contained in naphtha or gasoline streams by adsorption of the aromatic hydrocarbons on silica gel. In another particular aspect it relates to improvements in methods for desorbing and recovering aromatc hydrocarbons adsorbed on silica gel, and in still another aspect it relates to methods of washing and reviving used silica gel adsorbent.

In the manufacture of naphtha and gasoline stocks considerable quantities of aromatic hydrocarbons, such as toluene, benzene, xylenes and others, are often formed. This is especially noticeable in stocks made by processes utilizing non-catalytic polymerization of hydrocarbons contained in natural gas and processes of non-catalytic reforming of oil or naphtha stocks. Removal of these aromatic hydrocarbons for separate use is frequently desirable.

Prior to this invention aromatic compounds have been removed from admixture with paraffinic and naphthenic hydrocarbons by adsorption of the aromatics on silica gel. B. K. Tarasov, Chem. Abs., 21, 2379 (1927) has taught that in filtration through silica gel, the aromatic compounds are rapidly adsorbed at first, while paraffinic and naphthenic compounds are not, so that by using sufficient silica gel the whole of the aromatic compounds may be removed. Ellis, "Chemistry of Petroleum Derivatives," vol. II, p. 1155, Reinhold (1937) states that aromatic and olefin hydrocarbons may be separated from naphthenes and paraffins by filtration through silica gel and also states that considerable loss results in attempting to recover the adsorbed hydrocarbons by distillation from the adsorbing medium.

The use of silica gel for the recovery of aromatic hydrocarbons from hydrocarbon streams has also been taught in a patented process. U. S. 1,453,215, Voress et al., Gasoline Recovery Corp., April 24, 1923, teaches the adsorption of aromatics on charcoal or silica gel, desorption of the aromatics with steam and subsequent displacement of the steam with light hydrocarbons to cool the adsorbent. U. S. 1,886,261, Miller et al., Silica Gel Corp., November 1, 1932, and U. S. 1,678,298, Patrick et al., Silica Gel Corp., July 24, 1928, teach the use of silica gel in oil refining for the removal of sulfur, gum-forming constituents, unsaturates, etc. Methods for reactivating or revivifying spent silica gel are taught in U. S. 1,872,873, Miller, February 4, 1930, U. S. 1,868,581; Miller, Silica Gel Corp., July 26, 1932; and U. S. 1,822,303, Miller, Silica Gel Corp., September 8, 1931.

Briefly, the prior art teaches that aromatics, together with unsaturates, gum-forming constituents, sulfur, etc., may be removed from hydrocarbon streams by adsorption on silica gel and that adsorbed substances may be removed from silica gel by distillation therefrom or by desorption with water followed by reactivation of the silica gel by heating to drive off the water.

There are great disadvantages to the use of either of these methods for the recovery of aromatic compounds from adsorption on silica gel. Distillation from the gel results in large losses of these compounds and heating the large mass of loose gel to distillation temperatures is difficult. The difficulty in properly heating the mass of loose, granular gel throughout is intensified when attempts are made to free the gel from water by means of heat, as temperatures of the order of 500 to 600° C. are required to drive off water adsorbed on the gel.

One object of this invention is to provide a novel improved process for the recovery of aromatic hydrocarbons in highly concentrated form from naphthas or other hydrocarbon mixtures.

Another object of the invention is to provide a continuous cyclic process whereby aromatic hydrocarbons are selectively adsorbed on silica gel from admixture with other hydrocarbons, are recovered from the silica gel by means of a volatile organic displacing fluid, are separated from the displacing fluid by distillation and the silica gel is revivified by contacting with hot butane or other hydrocarbon.

Another object of the invention is to provide a cycle of displacements which may be easily and economically operated.

Figure 2:
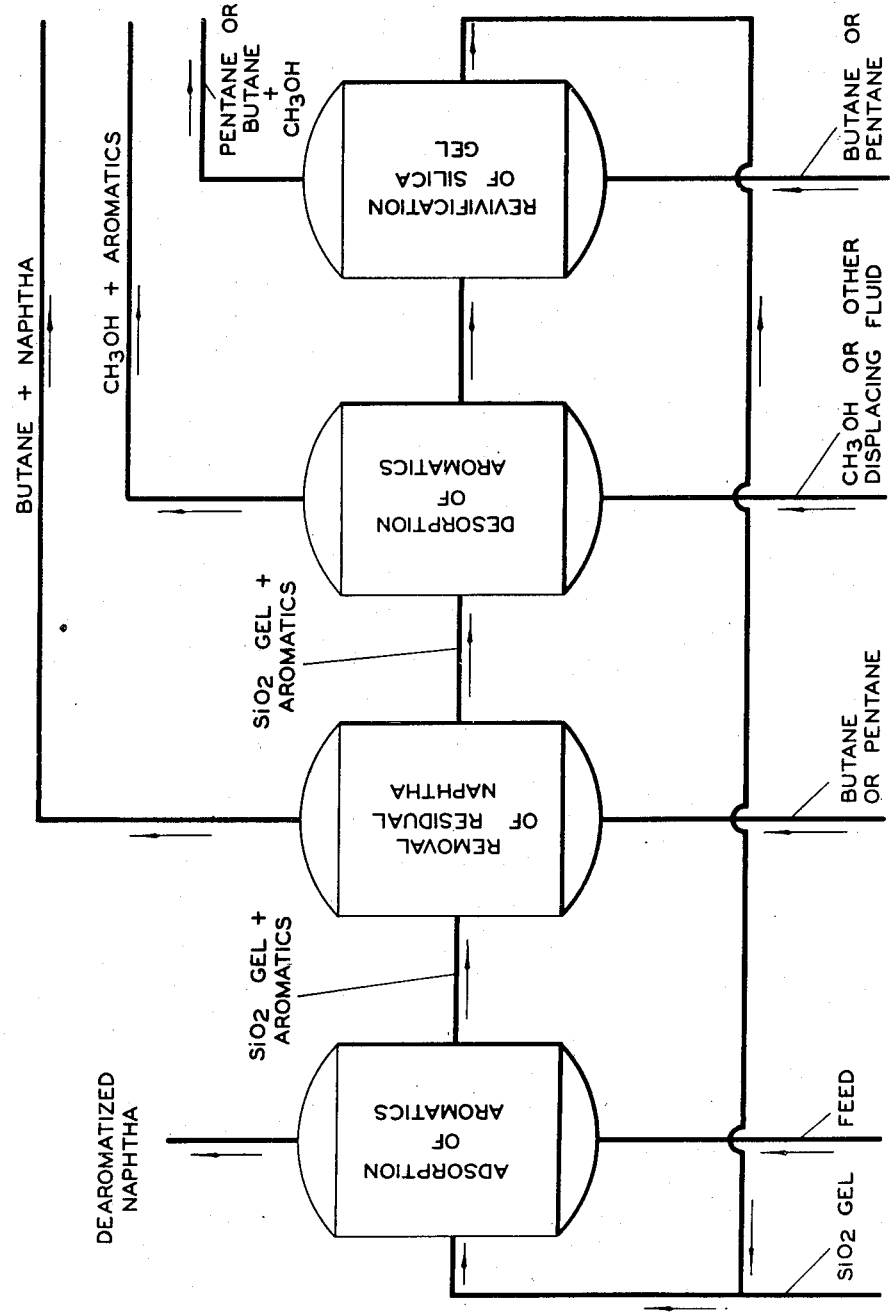

Other objects and features of novelty will be apparent from the description taken in connection with the drawing, in which Figure 1 shows diagrammatically one preferred embodiment of our invention in which stationary masses of silica gel are used, and Figure 2 shows diagrammatically another preferred embodiment of our invention in which the silica gel is moved through a series of succeeding steps in the cycle of operations.

We have observed that both aromatics and olefins are initially adsorbed from hydrocarbon streams on silica gel, but as adsorption progresses the olefins are displaced by aromatics; and that such adsorbed aromatics may be desorbed from the gel by volatile organic displacing fluids such as methanol, acetone, or ethanol at room temperatures or by a hydrocarbon at elevated temperatures. The temperature required will be lowered in going from paraffinic to olefinic to aromatic displacing fluids. We have also found that silica gel containing aromatic hydrocarbons adsorbed from a naphtha or gasoline stream may be flushed with a low-boiling liquid paraffin hydrocarbon such as pentane or butane at room temperature to remove residual naphtha or gasoline without removing the adsorbed aromatic hydrocarbons. This may advantageously be done prior to desorption of the aromatic hydrocarbons from the gel by means of volatile organic displacing fluids. We have found that butane vapor at 400–750° F. will displace aromatic hydrocarbons from the gel but 600–650° F. is a preferred operating range.

In accordance with the practice of our invention a fraction containing aromatic hydrocarbons in high concentration may be recovered from naphtha or gasoline streams by adsorption on silica gel at substantially atmospheric temperatures. By continuing the process of adsorption until from 5 to 10 weight per cent of the gel, or preferably 8 to 10 weight per cent, of hydrocarbons are adsorbed only small quantities of non-aromatic materials are retained on the gel and these materials are principally olefins. Non-adsorbed hydrocarbons remaining in the gel are flushed out by washing with a low-boiling paraffin hydrocarbon in liquid phase, thus removing hydrocarbons having boiling points near those of the adsorbed aromatic hydrocarbon before desorption of the latter. The aromatic hydrocarbons are then desorbed from the gel by contact with a volatile organic displacing fluid, recovered from the displacing fluid by fractional distillation and the gel is revivified by removal of the displacing fluid by means of a stream of hot vapors of low-boiling paraffin hydrocarbon.

A preferred modification comprises the combination of the desorption and revivification steps in one operation by the use of vapors of butane or pentane at a temperature of from 400 to 700° F., whereby the aromatic hydrocarbons are desorbed from the gel and the gel is left in condition for reuse immediately on cooling to adsorption temperature.

Studies were made to determine the amount of aromatic hydrocarbons retained on silica gel after passing a gasoline containing 30% aromatics and 19% olefins by weight through the gel, to determine whether serious olefin polymerization occurs during such adsorption and to determine whether methanol can be completely removed from the gel at 500° F.

The aromatic hydrocarbon concentrate recovered from the gel amounted to about 10% of the weight of the gel and contained 85% aromatics with the remainder consisting principally of olefins.

No noticeable polymerization of olefins was encountered and the alcohol appeared to be completely removed from the gel.

The apparatus and procedure used were as follows:

73 cc. (48 grams) of 28–80 mesh silica gel was placed in a 1.5 cm. x 50 cm. water-jacketed tube. 100 cc. of gasoline was allowed to filter through the gel during a 30 minute period. After draining off excess gasoline 50 cc. of n-pentane was added to the gel. The pentane was allowed to drain through the gel and a slow stream of nitrogen was then passed through the gel for 15 minutes to weather out the pentane. 100 cc. of methanol was then passed through the gel to displace aromatic hydrocarbons from the gel. All the steps mentioned above were performed at room temperature. The methanol was then removed from the gel by passing a slow stream of nitrogen over the gel for two hours at 500° F.

The gasoline used has the following characteristics:

Boiling range_____ 100–350° F.
Refractive index at 20° C_____ 1.4225
Bromine number_____ 37.0 (9.0 cc. 1% Br₂ per cc. sample)

Composition, weight percent, approx.:

Aromatics _____ 30
Olefins _____ 19
Paraffins and naphthenes_____ 51
                                            ———
                                            100

The gasoline was collected in successive portions after its passage through the silica gel and these successive portions of filtrate had the following properties:

| Sample No. | Volume, cc. | Refractive Index at 20° C. | cc. 1% Br₂ per 1 cc. sample |
|---|---|---|---|
| 1 | 15.5 | 1.4045 | 5.2 |
| 2 | 8.1 | 1.4073 | 11.7 |
| 3 | 7.0 | 1.4143 | 11.7 |
| 4 | 8.3 | 1.4171 | 10.5 |
| 5 | 8.2 | 1.4198 | 9.5 |
| 6 | 8.8 | 1.4217 | 9.5 |
| 7 | 18.2 | 1.4220 | 9.0 |
| Total volume | 74.1 | | |

The amount remaining on the gel was

100 − 74.1 = 25.9 cc.

In the flushing step 50 cc. of n-pentane having a refractive index of 1.3572 at 20° C. was used. After passing through the gel successive portions of filtrate having the following properties were collected:

| Sample No. | Volume, cc. | Refractive Index at 20° C. | cc. 1% Br₂ per 1 cc. sample |
|---|---|---|---|
| 8 | 4.5 | 1.4222 | 9.0 |
| 9 | 10.5 | 1.4239 | 9.0 |
| 10 | 9.9 | 1.4181 | 8.5 |
| 11 | 6.2 | 1.3978 | 5.5 |
| 12 | 8.5 | 1.3782 | 2.8 |
| 13 | 14.5 | 1.3692 | 1.2 |
| 14 | 5.5 | 1.3694 | 0.2 |
| Total volume | 59.6 | | |

In the desorption step 100 cc. of methanol was used and successive portions of the filtrate were examined with the following results:

| Sample No. | Volume, cc. | Refractive index at 20° C. | cc. 1% Br₂ per 1 cc. sample |
|---|---|---|---|
| 15 | 5.2 | 1.4252 | 1.8 |
| 16 | 26.5 | 1.3491 | 0.5 |
| 17 | 68.0 | 1.3290 | |

Samples 15 and 16 were then washed with water and the volume and refractive index were again determined as follows:

| Sample No. | Volume, cc. | Refractive index at 20° C. |
|---|---|---|
| 15 | 5.2 | 1.4242 |
| 16 | 2.7 | 1.4605 |

A simple distillation of sample 15 showed the presence of about 45% of pentane. Data obtained were:

|  | Degrees Centigrade |
|---|---|
| Initial boiling point | 40 |
| 20% | 45 |
| 40% | 65 |
| 50% | 120 |
| 60% | 145 |
| 70% | 155 |
| 80% | 165 |
| 90% | 170 |

The aromatic hydrocarbons recovered in samples 15 and 16 were calculated thus:
Sample 15: 5.2 cc.×.55×0.9=2.6 cc.=2.2 gms.
Sample 16: 2.7 cc.×0.75=2.0 cc.= 1.7 gms.

Total aromatic hydrocarbons recovered _____ 3.9 gms.

The total quantity of aromatic hydrocarbons recovered amounted to 8.1% of the weight of the gel used.

The foregoing experiment was repeated using the same equipment and procedure except that the gel was dried for four hours at 700° F. before use, 75 cc. of gasoline was used in the adsorption step, liquid isopentane was used in the flushing step and hot n-butane was used in a combined desorption and revivification step.

Properties of the successive portions of filtrate from the adsorption step were:

| Sample No. | Volume, cc. | Refractive Index at 20° C. | Bromine No. |
|---|---|---|---|
| 1 | 10.0 | 1.4012 | 14.0 |
| 2 | 5.0 | 1.4040 | 31.0 |
| 3 | 5.0 | 1.4077 | 42.0 |
| 4 | 5.0 | 1.4120 | 49.5 |
| 5 | 5.0 | 1.4141 | 47.2 |
| 6 | 5.2 | 1.4172 | 45.0 |
| 7 | 5.0 | 1.4193 | 39.0 |
|  | 40.2 |  |  |

The volume retained on the gel was 75−40.2=34.8 cc.

The adsorption step was followed by flushing with 50 cc. of isopentane and successive portions of filtrate were collected. Their properties included:

| Sample No. | Volume, cc. | Refractive Index at 20° C. | Bromine No. |
|---|---|---|---|
| 8 | 12 | 1.4211 | 39.0 |
| 9 | 10 | 1.4078 | 39.0 |
| 10 | 5 | 1.4061 | 35.0 |
| 11 | 10 | 1.3848 | 17.5 |
| 12 | 10 | 1.3692 | 8.2 |
| 13 | 7 | 1.3650 | 4.1 |
| Total | 54 |  |  |

Desorption was conducted by means of vapor of n-butane at 650° F. A quantity of vapor equivalent to 14.6 liters at normal temperature and pressure was used. 4.6 cc. of liquid having a refraction index at 20° C. of 1.4890 and a bromine number of 5.7 was recovered.

The aromatic content of this liquid was calculated as follows:

$$4.6 \times 0.85 \times 0.95 = 3.7 \text{ gms.}$$

This quantity amounted to 7.7 weight per cent of the gel.

The operation of our invention may be more readily understood by reference to the accompanying drawing. In Figure 1 one preferred modification, using stationary masses of silica gel is shown. Adsorption chambers 1, 2, 3, and 4 contain silica gel and are manifolded so that the steps of adsorption, washing, desorption and revivification may be carried on in a continuous sequence. A gasoline or naphtha stock containing aromatic hydrocarbons is introduced via line 5 and valve 9 into adsorption chamber 4, valves 6, 7 and 8 being closed. The effluent from which aromatic hydrocarbons have been removed is withdrawn via line 13, valve 17 and line 18 to storage, further processing or use as desired.

During the adsorption step in chamber 4 washing, desorption and revivification steps are carried out in chambers 3, 2 and 1, respectively, which are assumed to have passed through the preceding steps of the cycle. Through chamber 3, which is assumed to have completed the adsorption step, is passed a stream of liquid butane or pentane via line 19 and valve 21. Residual dearomatized naphtha is thereby removed from the silica gel and passes via line 12, valve 16 and line 18 to a butane removal step (not shown) or to storage, as desired.

Chamber 2, which is assumed to have completed the adsorption and washing steps just described, receives via line 24 and valve 27 a stream of vapors of a volatile organic displacing fluid which may be methanol, ethanol, or acetone at temperatures near their boiling points or a low-boiling paraffin at elevated temperatures. These vapors remove the adsorbed aromatic hydrocarbons. The effluent is carried via line 11, valve 34 and line 37 to fractionation system 39, where the displacing fluid is separated from the aromatic product. The highly concentrated aromatic product is withdrawn via line 40.

Chamber 1 is assumed to have passed through the adsorption, washing and desorption steps and to contain silica gel and retained displacing fluid. Butane or pentane at temperatures between 450 and 750° F. is admitted via line 50 and valve 41. The hot hydrocarbon purges the displacing fluid from the silica gel and restores the gel to a condition favorable to adsorption of aromatics. The flow of hot hydrocarbon may be discontinued sufficiently in advance of the beginning of the next cycle to permit cooling of the silica gel. If desired, a stream of cold light paraffin hydrocarbon or dearomatized naphtha may be employed for the cooling by passing it in heat exchange with the hot chamber. The effluent hydrocarbon-displacing fluid stream from chamber 1 passes via line 10, valve 29 and line 45 to fractionation system 38, where the light hydrocarbon is separated from the higher-boiling displacing fluid if methanol, acetone or ethanol is used. The higher-boiling materials are taken via line 46 to the fractionation system 39, while the light hydrocarbon passes either to cooling means 47 or to the desired adsorption chamber via line 50.

It is obvious the step of purging the gel of displacing fluid may be omitted when butane or pentane at elevated temperature is used as the displacing fluid. In this case it would be necessary merely to cool the chamber before proceeding to the adsorption step.

The process may be operated so that approximately the same amount of time is required for each step and if desired, time cycle controls may be used for switching valves. The length of the adsorption cycle will depend upon the composition of the stream being treated, the activity of the silica gel and the size of the adsorption chambers in relation to the volume of naphtha handled. In general, the adsorption step should be continued for a sufficient length of time to permit a substantial proportion of the olefins adsorbed initially to be replaced by aromatics, and until the adsorbed aromatics amount to from 5% to 10% by weight of the gel. Analysis of the effluent for aromatic content may be employed to determine the optimum cycle length.

Periodic renegeration of the silica gel either in situ or in a regeneration furnace may be employed to restore its activity. For this purpose heated flue gas containing a small proportion of oxygen is preferred.

Fractionation systems 38 and 39 may consist of any number of columns or include means for azeotropic distillation if such be desired.

Another preferred modification is shown in Figure 2. Here the process is carried out in four stages as in the modification previously described but the silica gel is passed continuously from one stage to the next instead of being retained in fixed beds. Figure 2 shows schematically the steps of adsorption, washing, desorption and revivification carried out so that the flow of hydrocarbons, washing, revivifying and displacing fluids is substantially constant and is not switched from one stage to another. In each stage the silica gel comes in contact, and preferably in countercurrent contact, with the hydrocarbon washing, revivifying, or displacing fluid stream at a rate such that the entire process may be carried on continuously. Suitable separation means (not shown) are provided for recovery of pentane or butane from the dearomatized naphtha, separation of the desorbed aromatic hydrocarbons from the displacing fluid, and separation of pentane or butane from the displacing fluid. Conventional methods for insuring efficient contact between the moving silica gel and the various fluids and for transferring the silica gel from chamber to chamber may be employed.

There are special advantages to be obtained from each step of our process and also from the use of the steps in combination. By so regulating the time of adsorption that the olefins adsorbed on the silica gel initially are later replaced to a substantial degree by aromatic hydrocarbons an adsorbate especially concentrated in aromatics is obtained. By washing residual naphtha or gasoline from the silica gel with low-boiling paraffin hydrocarbons before the desorption step contamination of the desorbed aromatic with paraffinic or naphthenic hydrocarbons of approximately equal boiling ranges is prevented. By the use of a volatile organic displacing fluid such as methanol, acetone or ethanol for desorption the aromatic hydrocarbons are removed from the gel with efficiency equal to that with which the aromatics are removed by water, while such residual displacement fluid left on the gel can be removed therefrom with much greater ease than residual water. By the use of butane or pentane vapors at 400–750° F. for the removal of residual volatile organic displacing fluid substantially complete removal of said fluid is obtained and the gel is placed in condition for further adsorption of aromatic hydrocarbons without the necessity of heating the large mass of loose gel to high temperatures.

Especial advantages are gained when butane or pentane vapors at 400 to 750° F. are used as the displacing fluid. In this case the steps of desorption and revivification are combined into one operation with corresponding economies in equipment and materials. It would be possible to fractionate the liquid butane or pentane used in the washing step and to reuse the same purified material as hot vapor in the combined desorption and revivification steps. In any case the butane or pentane used in the washing step may be purified by fractionation and used as a source of hot vapor for the revivification step.

*Example*

A plant for the recovery of aromatic hydrocarbons from gasoline comprises four 10 ft. by 40 ft. catalyst cases containing a total of 500,000 pounds of silica gel and interconnected by manifolds as shown in Figure 1. These manifolds are equipped with time cycle valves to permit performance of the following consecutive operations:

(1) Adsorption of aromatics from gasoline feed,
(2) Flushing residual gasoline from gel with liquid butane,
(3) Removal of butane from gel by reduction in pressure,
(4) Desorption of aromatic hydrocarbons by methanol,
(5) Desorption of methanol by hot butane,
(6) Cooling gel chamber.

A gasoline stock containing approximately 30 weight per cent of aromatics is fed to the adsorption unit at a rate of 160 barrels per hour, while the four-chamber-system operates on a four-hour cycle. 360 barrels of liquid butane are used per hour in the flushing step and of this quantity 173 barrels are removable by draining while 187 barrels are held in the gel. The total quantity used in each cycle amounts to 0.67 volume per volume of gel.

In the desorption step 400 barrels of methanol are used per hour, an amount equivalent to 0.74 volume per volume of gel treated. 265 barrels of hot butane are used per hour in removing methanol from the gel. Heating and cooling loads each amount to about 15 million b. t. u. per hour. Approximately 1000 barrels of aromatic hydrocarbons per day are recovered.

Having described our invention and explained its operation, we claim:

1. In the art of recovering aromatic hydrocarbons from a liquid hydrocarbon mixture also containing paraffinic, naphthenic and olefinic hydrocarbons, that improvement which comprises contacting such a liquid hydrocarbon mixture with silica gel at substantially atmospheric temperature until the gel has adsorbed from 8 to 10 per cent of its weight of hydrocarbons including aromatic hydrocarbons together with some olefinic hydrocarbons, flushing non-adsorbed hydrocarbons having boiling points near those of said aromatic hydrocarbons from the said silica gel with liquid low-boiling paraffin hydrocarbon at substantially atmospheric temperature, draining excess low-boiling paraffin hydrocarbon from the silica gel, subjecting a resulting liquid effluent from said flushing to distillation and separating vapors of said low-boiling paraffin hydrocarbon from said non-adsorbed hydrocarbons, passing resulting vapors of said low-boiling paraffin hydrocarbon over the silica gel at a temperature of 600° to 650° F. thereby simultaneously desorbing aromatic hydrocarbons from the silica gel and revivifying said gel, separating the resulting mixture of low-boiling paraffin and aromatic hydrocarbon by fractional distillation into a low-boiling paraffin fraction and an aromatic fraction, and re-using said silica gel for the adsorption of further quantities of aromatic hydrocarbons from said mixture of hydrocarbons.

2. The process of claim 1 wherein the liquid low-boiling paraffin hydrocarbon is pentane.

3. The process of claim 1, wherein the liquid low-boiling paraffin hydrocarbon is butane.

4. In the separation and recovery of an aromatic hydrocarbon from a normally liquid hydrocarbon mixture which also contains paraffin and olefin hydrocarbons, the improvement which comprises contacting such a liquid hydrocarbon mixture at atmospheric temperature with an adsorbent silica gel for a time such that said silica gel has adsorbed 8 to 10 per cent of its weight of hydrocarbons including primarily aromatic hydrocarbons and some olefin hydrocarbons, washing resulting silica gel with liquid butane at atmospheric temperature and recovering an effluent liquid butane containing non-aromatic normally liquid hydrocarbon remaining on said silica gel from the first said liquid hydrocarbon mixture, subjecting said effluent liquid butane to distillation and separating butane vapors from said accompanying normally liquid non-aromatic hydrocarbons, heating said butane vapors to 600–650° F. and contacting same with said washed silica gel to displace adsorbed aromatic hydrocarbons, recovering resulting concentrated aromatic hydrocarbons from effluents of the last said contacting, and cooling resulting aromatic-free silica gel and recontacting a further portion of said normally liquid hydrocarbon mixture therewith.

WILLIAM G. HIATT.
CARY R. WAGNER.

REFERENCES CITED

The following references are of record in the file of this patent:

UNITED STATES PATENTS

| Number | Name | Date |
| --- | --- | --- |
| 2,384,311 | Kearby | Sept. 4, 1945 |
| 2,390,536 | Houdry et al. | Dec. 11, 1945 |
| 2,395,491 | Mavity | Feb. 26, 1946 |
| 2,398,101 | Lipkin | Apr. 9, 1946 |
| 2,415,315 | Walter et al. | Feb. 4, 1947 |